(12) United States Patent
Bradley et al.

(10) Patent No.: US 10,796,079 B1
(45) Date of Patent: Oct. 6, 2020

(54) GENERATING A PAGE LAYOUT BASED UPON ANALYSIS OF SESSION VARIABLES WITH RESPECT TO A CLIENT DEVICE

(71) Applicant: Amazon Technologies, Inc., Seattle, WA (US)

(72) Inventors: Joseph Bradley, Seattle, WA (US); Lakshya Bhagat, Seattle, WA (US); Nick Ciubotariu, Kenmore, WA (US); Michael Albert Galassi, Seattle, WA (US); William Kevan Bennett Kennedy, Seattle, WA (US); Alexander Michael Spinelli, Seattle, WA (US); Nathan Andrew Sterken, Seattle, WA (US); Andrew James Will, Chandler, AZ (US); Wei Zhang, Issaquah, WA (US); Albert J. Kennis, Shizuoka (JP); Thomas Jay Hoover, Seattle, WA (US); Neil Christopher Fritz, Tempe, AZ (US)

(73) Assignee: Amazon Technologies, Inc., Seattle, WA (US)

(*) Notice: Subject to any disclaimer, the term of this patent is extended or adjusted under 35 U.S.C. 154(b) by 176 days.

(21) Appl. No.: 14/859,768

(22) Filed: Sep. 21, 2015

(51) Int. Cl.
| | | |
|---|---|---|
| *H03H 17/00* | (2006.01) | |
| *H03M 7/30* | (2006.01) | |
| *G06F 40/16* | (2020.01) | |
| *H04L 29/08* | (2006.01) | |
| *H04L 12/26* | (2006.01) | |
| *G06F 40/14* | (2020.01) | |

(Continued)

(52) U.S. Cl.
CPC .............. *G06F 40/16* (2020.01); *G06F 40/00* (2020.01); *G06F 40/106* (2020.01); *G06F 40/14* (2020.01); *G06F 40/149* (2020.01); *H04L 43/0888* (2013.01); *H04L 67/02* (2013.01); *G06F 40/103* (2020.01)

(58) Field of Classification Search
CPC .............. G06F 17/2282; G06F 17/212; G06F 17/2247; G06F 17/2258; H04L 43/0888; H04L 67/02
USPC ......................................................... 715/234
See application file for complete search history.

(56) References Cited

U.S. PATENT DOCUMENTS

| | | | | |
|---|---|---|---|---|
| 6,243,761 B1 * | 6/2001 | Mogul | ..................... | H04L 29/06 709/217 |
| 8,311,900 B1 * | 11/2012 | Bates | ................. | G06Q 30/0601 705/27.2 |

(Continued)

OTHER PUBLICATIONS

Latency (engineering)—Wikipedia, https://en.wikipedia.org/wiki/Latency_(engineering), Last Edited Date: Oct. 19, 2018 (see attached document 14859768_Wikipedia_LatencyDef.pdf) (Year: 2018).*

*Primary Examiner* — Cesar B Paula
*Assistant Examiner* — Luu-Phuong T Nguyen
(74) *Attorney, Agent, or Firm* — Thomas Horstemeyer, LLP

(57) ABSTRACT

Disclosed are various embodiments for selecting page layouts based upon an outcome prediction associated with a request for a content page. Session variables associated with a request can be extracted. A score can be calculated based upon the session variables. The score can be generated by a machine learning engine that is trained using archived session data. A page layout can be selected based upon the generated score and a respective content page generated.

19 Claims, 6 Drawing Sheets

(51) Int. Cl.
*G06F 40/106* (2020.01)
*G06F 40/149* (2020.01)
*G06F 40/00* (2020.01)
*G06F 40/103* (2020.01)

(56) References Cited

U.S. PATENT DOCUMENTS

| | | | | |
|---|---|---|---|---|
| 8,615,431 | B1* | 12/2013 | Bell | G06Q 30/0241 705/14.48 |
| 8,671,353 | B1* | 3/2014 | Varadarajan | G06Q 30/0201 715/763 |
| 9,953,011 | B1* | 4/2018 | Anderson | G06F 17/217 |
| 10,289,658 | B1* | 5/2019 | Chen | G06F 40/14 |
| 2002/0101880 | A1* | 8/2002 | Kim | H04L 29/06 370/465 |
| 2008/0049775 | A1* | 2/2008 | Morrill | H04L 41/147 370/419 |
| 2008/0134043 | A1* | 6/2008 | Georgis | H04N 7/10 715/733 |
| 2009/0248494 | A1* | 10/2009 | Hueter | G06Q 10/00 705/7.29 |
| 2010/0017704 | A1* | 1/2010 | Jaffe | G06F 17/30867 715/243 |
| 2010/0131455 | A1* | 5/2010 | Logan | G06F 16/9577 707/602 |
| 2010/0269036 | A1* | 10/2010 | Berger | G06F 40/186 715/243 |
| 2010/0269044 | A1* | 10/2010 | Ivanyi | G06Q 30/02 715/736 |
| 2011/0054960 | A1* | 3/2011 | Bhatia | G06Q 30/02 705/7.12 |
| 2012/0166308 | A1* | 6/2012 | Ahmed | G06Q 20/12 705/26.41 |
| 2013/0132616 | A1* | 5/2013 | Worthington | G06F 11/3485 710/18 |
| 2013/0232167 | A1* | 9/2013 | Vidra | G06Q 30/0251 707/769 |
| 2014/0032468 | A1* | 1/2014 | Anandaraj | G06Q 30/02 706/46 |
| 2014/0068520 | A1* | 3/2014 | Missig | G06F 3/0482 715/841 |
| 2014/0081800 | A1* | 3/2014 | Liu | G06Q 30/0631 705/26.7 |
| 2014/0082019 | A1* | 3/2014 | Taylor | H04L 67/02 707/770 |
| 2014/0297799 | A1* | 10/2014 | Gordon | A63F 13/338 709/217 |
| 2014/0372415 | A1* | 12/2014 | Fernandez-Ruiz | G06F 17/30991 707/722 |
| 2015/0007064 | A1* | 1/2015 | Givoni | G06F 16/958 715/760 |
| 2015/0100438 | A1* | 4/2015 | Malkin | G06Q 30/0277 705/14.73 |
| 2015/0131483 | A1* | 5/2015 | Colban | H04W 48/16 370/254 |
| 2015/0242374 | A1* | 8/2015 | Kong | G06F 17/212 715/201 |
| 2015/0310124 | A1* | 10/2015 | Ben-Aharon | G06F 40/186 715/205 |
| 2016/0021041 | A1* | 1/2016 | Zacharias | H04L 51/10 709/203 |
| 2016/0070551 | A1* | 3/2016 | Miller | G06F 17/30905 717/148 |
| 2016/0224557 | A1* | 8/2016 | Chi | G06F 16/9535 |
| 2016/0335250 | A1* | 11/2016 | Breitenbach | G06Q 30/0242 |

* cited by examiner

GENERATING A PAGE LAYOUT BASED UPON ANALYSIS OF SESSION VARIABLES WITH RESPECT TO A CLIENT DEVICE

BACKGROUND

Contemporary web sites often have numerous features or widgets that provide a specific type of information or perform a certain function. Users can access these web sites using various types of client devices and over various network connections. Client devices can have various properties, such as operating system, browser, memory, processor, etc. A network connection through which a web site is accessed can also have various properties, such as an internet protocol (IP) address, bandwidth, ping time, and other properties. The various permutations of client device and network connection properties can cause the latency between when a request for a page is received by a web server and when a requested content page is received and rendered by the client device.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
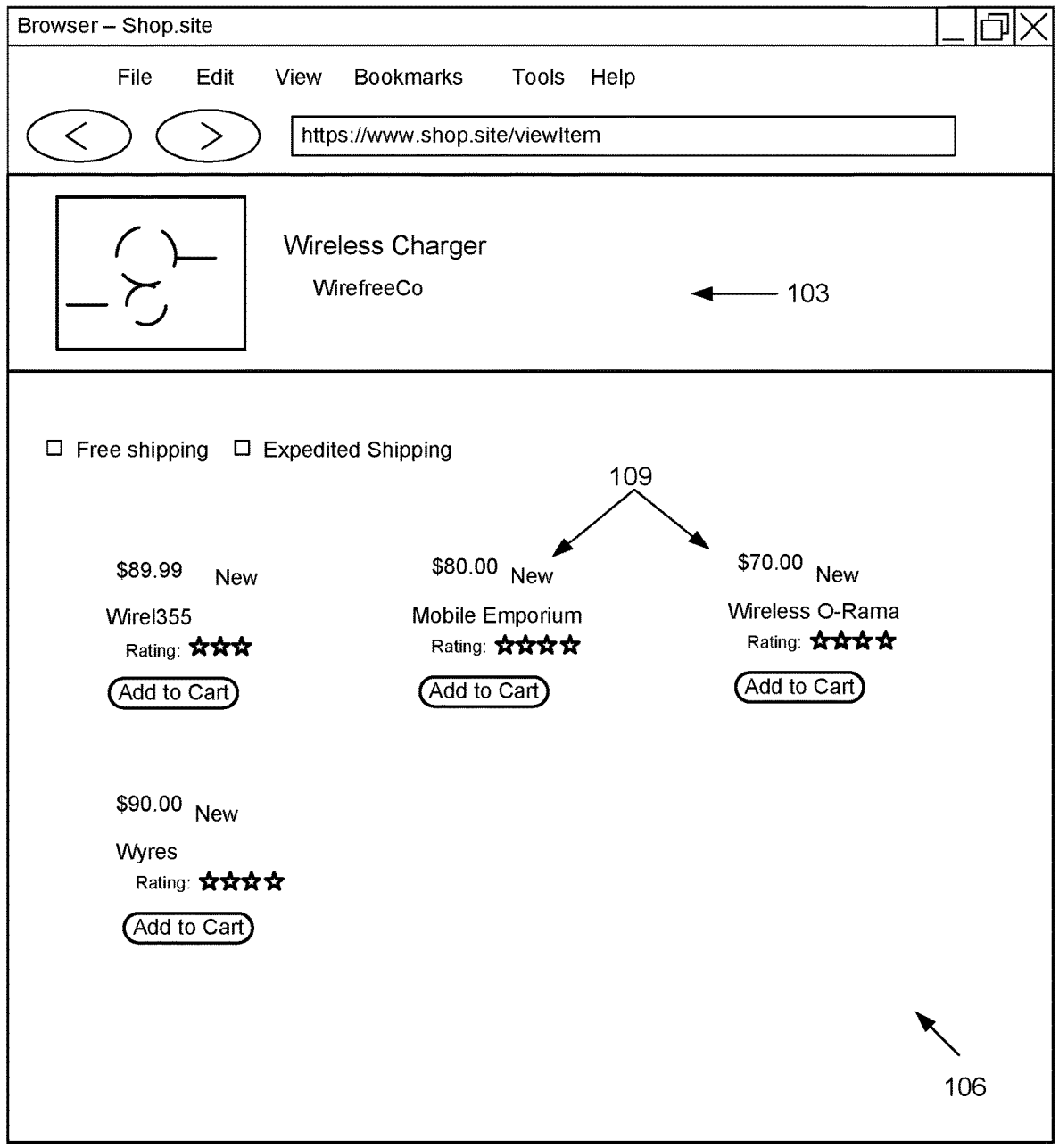
FIG. 1A is a pictorial diagram of an example user interface rendered according to various embodiments of the present disclosure.

The present disclosure relates to optimization of content page layout depending upon the properties that can be detected with respect to a particular client device, a network connection through which a client device is connected to a network, and a user account associated with the request. Network sites may include a variety of content page features that relate in some way to the primary content of a content page. To illustrate, an electronic commerce network site may include a number of content page features that recommend items to users with a general goal of increasing sales. Non-limiting examples of such features may include recommendation lists styled as "customers who bought X also bought Y," "customers who viewed X also viewed Y," "customers who viewed X ultimately bought Y," "recommendations based upon your recent browsing history," and so on. As another example, a search results page requested by a client device may include a feature that identifies search results that are relevant to a user-submitted search query.

A designer or operator of a network site may wish to optimize page layouts of content pages generated by the site and delivered to client devices such that the latency between when a request for a page is received and when a particular feature is rendered by the client device. Optimization of such a latency may be desired to optimize or improve a user experience. Optimization may also be desired to improve metrics associated with a network site, such as user experience metrics, sales metrics, or any other metrics with respect to a network site that can be tracked.

Embodiments of the disclosure can generate a score associated with a request for a content page that is received from a client device. The score can be associated with a predicted latency between when the request is received and when one or more features in a content page are rendered by the client device. These features may be referred to herein as critical features of a page or page layout. Embodiments of the disclosure can select, based upon the score generated for a request, a particular page layout based upon the client device and a network connection such that the page layout is optimized to achieve a balance between a richness of the page layout and rendering of the crucial features within the page by the requesting client device.

A score that is associated with a high predicted latency can result in a content page server serving a page with page layout that is less taxing to transmit over the network connection or that can be rendered more easily (i.e. using fewer processing resources) by the client device. A score that is associated with a lower predicted latency can result in the content page server serving a page that has a richer page layout. The score can be based on many factors, such as the speed of the network connection with the client device, the processing resources of the client device, a browser executed by the client device, a device type of the client device, or any other variables associated with a particular session between the content page server and the client device that can be detected.

Latency experienced by a user can be a significant factor that is correlated to user abandonment of browsing sessions. In some scenarios, users experiencing a high degree of latency may also exit a site and seek alternative sites. Accordingly, examples of this disclosure are directed to optimizing page layout to achieve certain outcomes, such as a predicted latency goal, to minimize or even prevent user abandonment of browsing sessions. In some scenarios, minimizing user abandonment can improve a user conversion rate or other sales and revenue metrics associated with a site.

Referring now to FIG. 1A, shown is one example of a user interface 100 rendered according to an embodiment of the present disclosure. The user interface 100 corresponds to a shopping cart confirmation page that indicates that a given item 103 has been added to a shopping cart. In addition, the user interface 100 includes a recommendation feature 106 that presents a plurality of recommended items 109. The recommended items 109 may be recommended by a recommendation engine because they are similar to the item 103 in some way, they may appeal to similar customers, and/or for other reasons.

The score associated with the predicted latency can be calculated from session variables that can be detected about the client device, the network connection or a user account of a user. The score can take into account these session variables and apply a function that is determined by a machine learning engine based upon an analysis of a population of users and historical session data that can be collected over time. In one example, the function can include coefficients that can be applied to session variables, where these coefficients are determined by machine learning engine that is configured to optimize the coefficients to achieve a particular outcome, such as the lowest possible latency between a request for the content page and rendering of critical features of the content page. The machine learning engine can be trained on data about previous site hits from a population of users of the site that can be detected and archived in a data store. The scoring function can also take into account the particular page or category of pages that are the subject of a request. In some scenarios, a page or group of pages associated with a site can be associated with a higher predicted latency than another page or group of pages, so the scoring function can take the identity of the requested page into account when generating a predicted latency associated with the request.

As will be discussed herein, a page layout engine or scoring function engine can include a machine learning engine that determines how session variables should be taken into account when selecting the page layout as well as the features (e.g., imagery, video) that are included in a requested content page in order to optimize for a certain outcome.

Referring to FIG. 1A, shown is an example of a content page 100 that is served by a content page server according to embodiments of the disclosure. In this example, the page layout is selected based upon an analysis of session variables about the client device requesting the content page, the network connection through which the client device contacts the content page server, and a user account associated with the request for the content page. The content page server can consult a page layout engine, which can select a particular page layout based upon the session variables. In other words, the page layout engine can provide page layout advice based upon an analysis of the session variables.

The page layout engine can provide page layout advice by calculating a score associated with a particular outcome, such as a predicted latency to rendering of critical page features. Scores in various ranges can be associated with different page layouts for the requested content page. A scoring function with which the score is calculated can be determined by a machine learning engine that is trained by historical outcome data for a population of users, such as a user base of a particular site. Page layouts can vary in terms of the layout of elements in a content page as well as by varying which elements are included in a content page. For example, a low-bandwidth page layout may not vary from a high-bandwidth page layout in terms of the location of various imagery of items in a page, but the size or quality of the imagery may vary between the two page layouts.

In some examples, the page layout engine can generate a content page corresponding to the selected page layout. In other examples, the page layout engine can identify a selected page layout while another application or engine generates the content page based upon the selected page layout. The content page server can then serve the content page to the client device over the network connection. In some examples, the content page can include client side code that is executed by a browser or other application on the client device. The client side code can report data about how long one or more critical features took to render. The data, or post-back data, can be archived in a data store along with other session variables that can detected with respect to the client device, network connection, and the user account. The data that is archived can be taken into account by the machine learning engine to potentially adjust a function that is used to score future requests for content pages.

In the example of FIG. 1A, the page layout of the content page 100 includes a grid layout where items are arranged in a grid pattern. Such a layout may require a client device that is rendering the content page to process table formatting structures within markup language that makes up the content page. These structures can require additional processing and bandwidth resources relative to a content page that does not include such a structure. The same can be said for a content page that includes high resolution imagery, video content, asynchronously updated components, or other relatively complex page components.

Figure 1B:
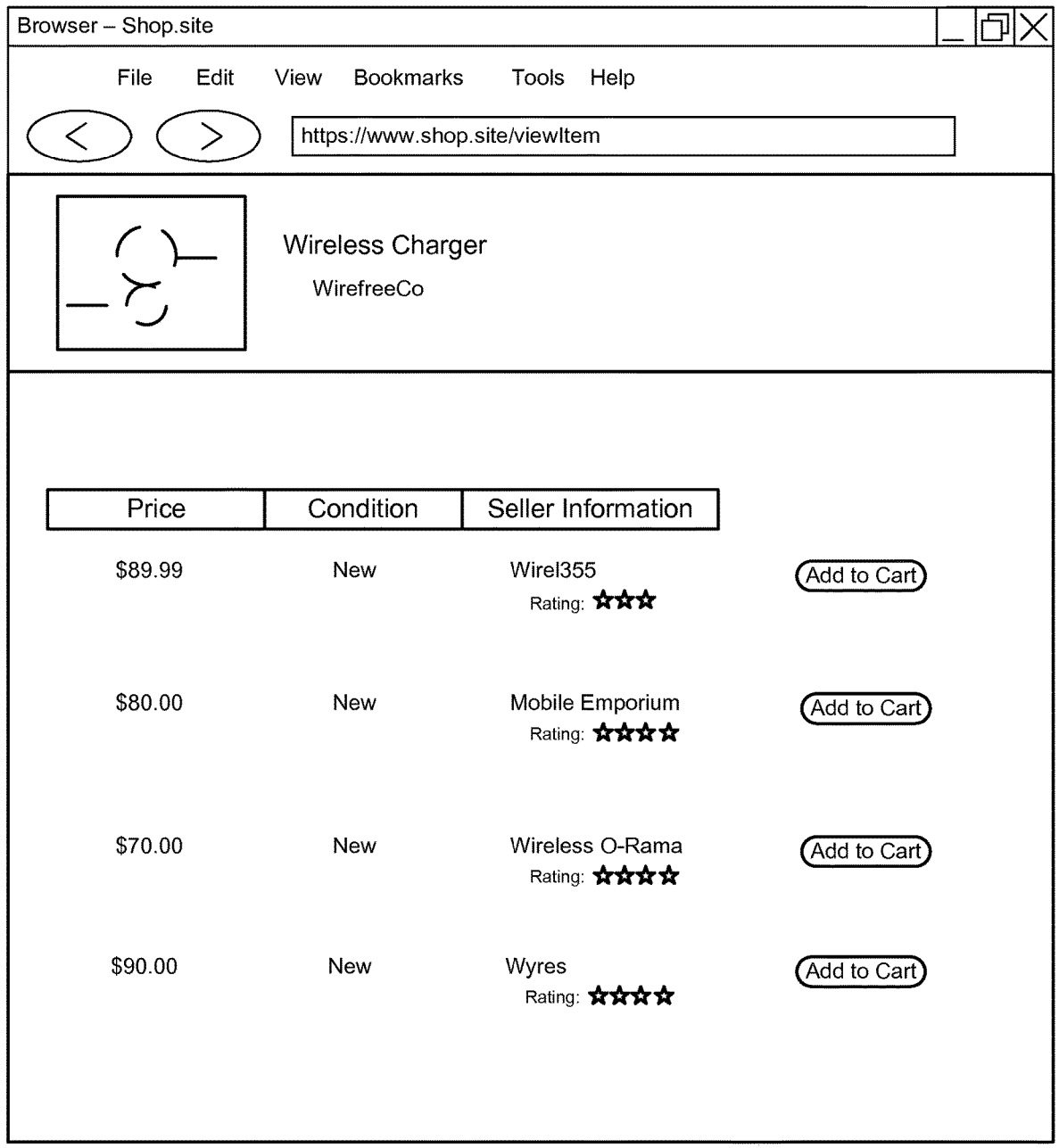
FIG. 1B is a pictorial diagram of an example user interface rendered according to various embodiments of the present disclosure.

Moving on to FIG. 1B, shown is a contrasting example of a content page 150 rendered according to embodiments of the disclosure. The content page 150 shown in FIG. 1B is associated with the same requested page as in the example of FIG. 1A. However, a page layout from which the content page 150 was generated varies from the layout of the content page 100 of FIG. 1A. The content page 150 can include a list layout where items are arranged in a simpler list. The list layout may not require the processing of complex table structures and may also be embodied in a file that is simply smaller than in the example of FIG. 1A. In some examples, the content page 150 can be generated with lower resolution imagery, with video content disabled, or without other page components that may require computing resources or higher bandwidth relative to the content page 100 of FIG. 1A.

In the examples of FIGS. 1A-1B, the content pages 100 and 150 can have varying layouts and vary in ways that can affect how long the content page 150 takes to render. For example, as noted above a low-bandwidth page layout can have lower quality imagery, have video content disabled, have tables or other complex formatting structures disabled, have page features that require asynchronous communication or updating disabled, or have other variations in page layout that can reduce the latency to meet a particular latency threshold.

A higher-bandwidth page layout can have higher quality imagery, have video content enabled, include more complex formatting and have page features requiring asynchronous updating or communication if a score calculated based upon the network connection, client device and historical data about latency associated with the user account reflects that a particular latency threshold is likely to be met. Embodiments of the disclosure can receive a request for a content page and then make a prediction regarding a particular outcome, such as a latency metric. Based on the prediction, a page layout for the requested content page can be chosen. If a prediction for a latency metric predicts that a low latency between when a content page is transmitted to the client device and when features on the content page are rendered, a higher-bandwidth layout can be chosen. If a prediction for a latency metric predicts that a high latency between when a content page is transmitted to the client device and when features on the content page are rendered, a lower-bandwidth layout can be chosen. In the following discussion, a general description of the system and its components is provided, followed by a discussion of the operation of the same.

Figure 2:
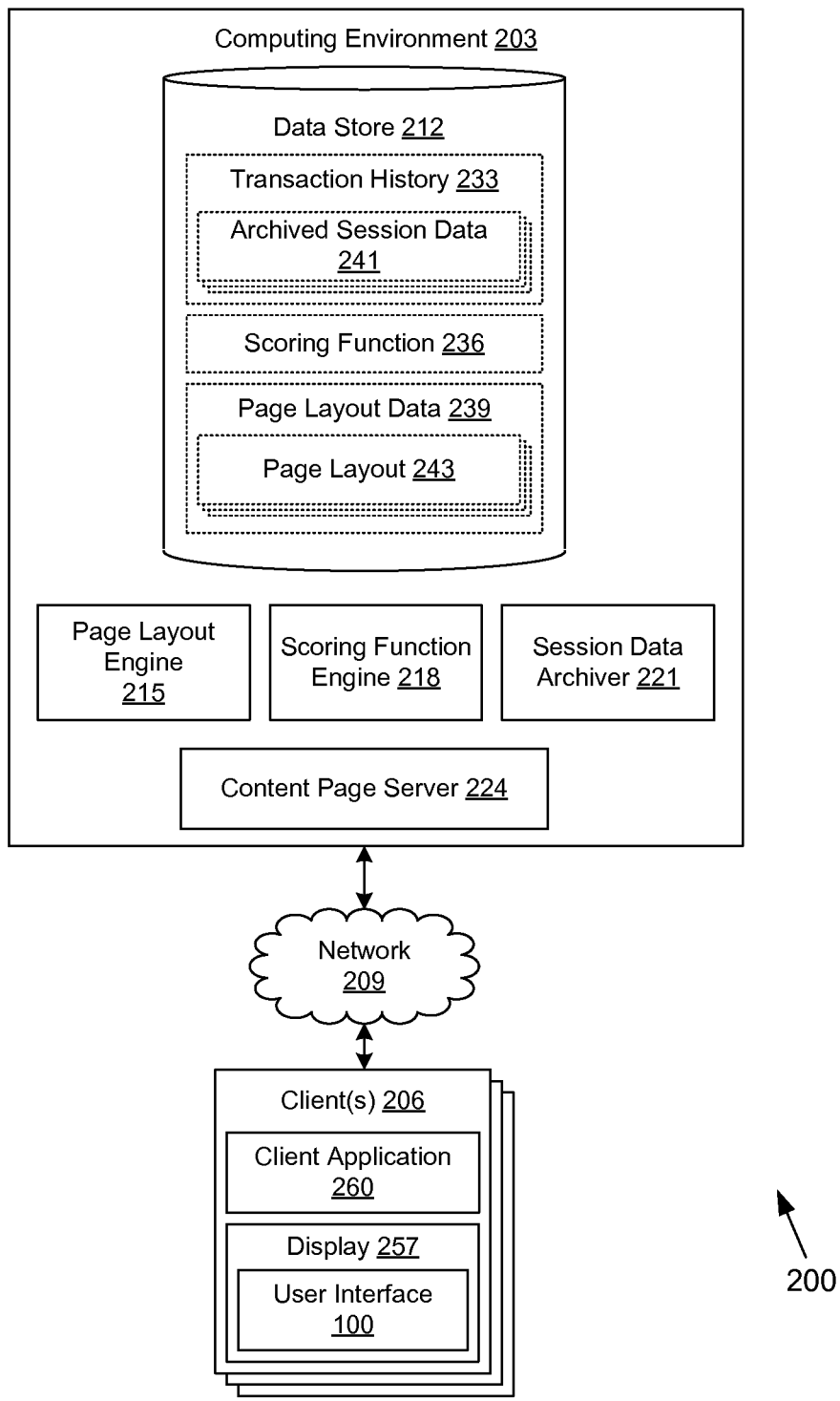
FIG. 2 is a schematic block diagram of a networked environment according to various embodiments of the present disclosure.

With reference to FIG. 2, shown is a networked environment 200 according to various embodiments. The networked environment 200 includes a computing environment 203 and one or more clients 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks, computer banks, or other arrangements. Such computing devices may be located in a single installation or may be distributed among many different geographical locations. For example, the computing environment 203 may include a plurality of computing devices that together may comprise a hosted or "cloud" computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a page layout engine 215, a scoring function engine 218, a session data archiver 221, a content page server 224, and other applications, services, processes, systems, engines, or functionality not discussed in detail herein. The page layout engine 215 is executed to identify a page layout for a particular content page that is requested by a client device 206. The page layout engine 215, in some embodiments, can also generate a requested content page according to a selected page layout. In other embodiments, the page layout engine 215 can select a particular page layout and provide an indication of the selection to another application, server or engine, which can take on the responsibility of generating the content page according to selected page layout.

The content page server 224 can receive requests for content pages from client devices 206 that are associated with users. The content page server 224 can incorporate functionality of a web server that serves content pages to client devices 206 over the network 209. In one embodiment, the content page server 224 can receive a request for a particular content page, such as a home page for a network site. The request can also incorporate other data from the client device 206, such as a search query that is received from a search page designed to receive a search request and request a search results page from the content page server 224. The content page server 224 can also serve content pages to client devices 206 that are generated by the page layout engine 215 or other applications. The content page server 224 can additionally receive data from the client device 206 that is generated by client side code embedded in content pages rendered by the client device 206. The data can correspond to performance data associated with rendering of a content page by the client device 206. As one example, the performance data can include a timestamp associated with when one or more critical features were rendered by the client device 206. In some embodiments, the client side code can be configured to transmit such data to another server or computing environment. The above scenario is but one example.

The scoring function engine 218 is executed to generate a scoring function that can be employed by the page layout engine 215 to calculate a score associated with a particular request for a content page that is received from a client device 206. The score determined by the scoring function engine 218 can be associated with a particular outcome for which a site designer wishes to optimize pages that are served to client devices 206. In one scenario, such an outcome can include a latency between when a request for a content page is received by the content page server 224 and when the page is generated by the page layout engine 215. In another scenario, the outcome can be a latency between when the request is received and when components of the content page (or the entirety of the content page) are rendered by the client device 206.

In another scenario, the outcome that the scoring function is configured to optimize for includes a user or customer engagement metric. For example, such a metric can take into account whether or how long a user interacts with a particular content page generated by the page layout engine 215. As another example, the scoring function can be configured to optimize for a sales metric associated with an electronic commerce site. In other words, the scoring function can facilitate selection of page layouts for content pages requested by client devices 206 such that a sales metric associated with content in the pages is maximized.

The scoring function engine 218 can generate a scoring function by analyzing historical session data associated with a population of users and store the scoring function in the data store 212 for use by the content page engine 215. In one embodiment, the scoring function engine 218 incorporates a machine learning engine that can analyze historical data about site hits or sessions of a population of users and generate a function that optimizes for a selected outcome. In one embodiment, the scoring function engine 218 can calculate coefficients that can be applied to certain session variables to generate a score that reflects a prediction of how close a particular request for a content page is to achieving an ideal outcome. The closer the score is to reflecting an ideal outcome, the better the score. In one embodiment, an ideal outcome can represent an extremely low latency of a network connection between the client device 206 and content page server 215. In such a scenario, the closer the score to reflecting the ideal outcome, the richer a page layout that can be selected by the page layout engine 215 for serving to the client device 206.

The session data archiver 221 is executed to obtain data from client devices 206 concerning a particular session or site hit and archive the data in the data store 212. The session data archiver 221 can assume the responsibility of archiving data with respect to a particular site hit (i.e. a request for a particular content page and subsequent rendering of the content page by the client device 206) or a particular session (i.e. a series of content pages requested and rendered by the client device 206). The session data archiver 221 can assume this responsibility rather than the content page server 224 to reduce or eliminate the latency associated with storage of session data in the data store 212. Instead, the content page server 224 only has to provide session data to a queue that is provided by the session data archiver 221 rather than dealing with data store 212 storage interactions, which may involve obtaining an exclusive lock on a data table, writing data to mass storage, obtaining confirmation that the data was stored, etc.

The data stored in the data store 212 includes, for example, a transaction history 233, a score function 236, and page layout data 239. The transaction history 233 contains information about previous or historical site hits or sessions of users of the site. The historical information can be stored as archived session data 241. The archived session data 241 can include session variables associated with a previous request for a content page as well as performance data associated with the previous request.

The session variables can include a network or IP address from which the requested originated, a browser application and/or browser version associated with the previous request, bandwidth of a network connection of the client device, a round-trip data travel time between the client device 206 and computing environment, geographic location data of the client device, or an internet service provider (ISP) of the client device 206. Session variables can also include an operating system of the client device, a display size of the client device, a processor speed or type of the client device, memory resources of the client device, or any other property of the client device 206 that can be detected or reported by the client device 206 to the session data archiver 221. Session variables archived in the transaction history 233 can also include one or more timestamps from which a latency can be calculated between the request for a particular content page was received when one or more critical features were rendered by the client device 206. Session variables can also include one or more timestamps from which a latency can be calculated between when the request for the content page was received and when transmission of the content page to the client device 206 began.

Archived session data 241 can also be associated with a particular user or user account. In this way, information about a particular site hit or session of a particular user can be taken into account by the page layout engine 215 in order to select a page layout for subsequent content pages requested by that user. Additionally, information about the user experience of a population of users can be taken into account to select page layouts for subsequent content pages requested by other users. Archived session data 241 can also be associated with a timestamp.

Another example of a session variable that can be captured and archived is a referrer page or referrer link associated with a request for a content page, query string data or post data associated with a request for a content page, or other contextual information that can be extracted from a request for a content page. For example, a search query associated with a request for a search results page can be extracted and archived as archived session data 241.

The scoring function 236 represents a scoring function that is generated by the scoring function engine 218 and stored in the data store 212 for use by the page layout engine 215. The scoring function 236 can identify one or more session variables and one or more coefficients for each of the session variables. The scoring function 236 can further identify a formula or function using certain session variables that can be computed by the page layout engine 215 to arrive at a predicted outcome. As noted above, the scoring function 236 can be generated by the scoring function engine 218 based upon an analysis of archived session data 241 using a machine learning engine. The machine learning engine can be configured to determine a scoring function 236 optimized to achieve a certain result identified by a site designer. One example of such a result or outcome is a latency between when a page is requested by a client device 206 and when the page is served to the client device 206. Another example of such a result or outcome is a latency between when the page is requested and when one or more critical features identified in a requested page are rendered by the client device 206.

In other words, the score function engine 218 can analyze archived session data 241 and determine a scoring function 236 that is optimized to achieve a desired outcome. As one example, the scoring function 236 can generate a scoring function 236 that characterizes those hits or sessions in the archived session data 241 that are close to or at the desired outcome. The scoring function 218 can execute continuously or iteratively so that the scoring function 236 is continually or periodically updated as additional archived session data 241 is stored in the data store. In one example, the scoring function engine 218 can be configured to weigh more heavily recent archived session data 241 relative to older archived session data 241 when generating a scoring function 236.

The page layout data 239 stores data with respect to content pages that can be requested by client devices 206 associated with users. The page layout data 239 can include various page layouts 243 that correspond to content pages that can be served by the content page server 224. In one embodiment, each page of a network site can be associated with various page layouts 243 that are in turn associated with different scores that can be generated by the page layout engine 215 using the scoring function. For example, a page layout 243 corresponding to the home page can include a low-latency page layout 243 and be served to a particular client device 206 if a score generated for a particular request for a content page results in a score corresponding to a low predicted latency.

Conversely, a page layout 243 corresponding to the home page can include a high-latency page layout 243 and be served to a client device 206 if a score generated for the request results in a score corresponding to a high predicted latency. The score generated by the page layout engine 215 using the scoring function 236 can be based upon the client device 206, a user or user account associated with the client device 206 or a request for a content page and/or a network connection of the client device 206.

The page layout data 239 can include many page layouts 243 for a particular content page that are associated with scores in various ranges. In other words, page layout data 239 can include many page layouts 243 corresponding to a content page for various predicted outcomes based upon a score computing for a request for a content page. For example, various page layouts 243 for a particular content page can have varying levels complexity, asynchronous components, imagery, audio, video and other aspects that contribute to how long a content page will take to be generated, transmitted and rendered by a client device 206.

Generally speaking, page layouts 243 include various data used in generating content pages. Such data may include hypertext markup language (HTML), extensible markup language (XML), plain text, images, audio, video and/or other data.

The client 206 is representative of a plurality of client devices that may be coupled to the network 209. The client 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers or other devices with like capability. The client 206 may include a display 257. The display 257 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client 206 may be configured to execute various applications, such as a client application 260 and/or other applications. The client application 260 may be executed in a client device 206, for example, to access network content served up by the computing environment 203 and/or other servers, thereby rendering a content page 100 on the display 257. To this end, the client application 260 may comprise, for example, a browser, a dedicated application, etc., and the content page 100 may comprise a content page, an application screen, etc. The client 206 may be configured to execute applications beyond the client application 260 such as, for example, email applications, social networking applications, word processors, spreadsheets, and/or other applications.

Next, a general description of the operation of the various components of the networked environment 200 is provided. To begin, users interact with a network site served up by the content page server 224 using clients 206. The users via the clients 206 may request a variety of content pages of the network site, such as gateway pages, detail pages, search result pages, shopping cart confirmation pages, order pipeline pages, and so on. The content page server 224 may serve a content page that is generated by the page layout engine 215 according to a page layout that is based upon a predicted outcome associated with the request for the content page. In one example, which is discussed throughout this disclosure but is not meant to be limiting in any way, the predicted outcome is a latency between when the request is received by the content page server 224 and when one or more identified features, or critical features, are rendered by the client device 206.

Upon receiving a request for a content page, the content page server 224 can either forward the request to the page layout engine 215 or extract session variables related to the request and provide the session variables to the page layout engine 215. In the former scenario, the page layout engine 215 can extract session variables associated with the request for the content page. The session variables can include information about the client device, the network connection on which the request is received or a user account associated with the request.

The page layout engine 215 can then compute a score based upon the session variables using the scoring function 236 from the data store 212. In one embodiment, the scoring function 236 can direct the page layout engine 215 to generate a score expressing a predicted latency of the request based upon historical latencies that are archived as archived session data 241. The scoring function 236 can take into account historical latencies of previous site hits associated with the user account and identify coefficients that should be applied to the historical latencies as determined by the scoring function engine 218.

In a linear model, the scoring function 236 can identify coefficients that should be applied to historical latencies of previous site hits that are associated with the particular user, client device 206, network connection or combinations thereof. More recent site hits can be more heavily weighted that less recent site hits. In some embodiments, the scoring function 236 can identify that a certain subset of historical latencies of previous site hits of the user should be taken into account to generate a score that expresses a predicted latency of the request for the content page. Based upon the score that is generated, the page layout engine 215 can generate a content page using a selected page layout 243 that corresponds to the score.

In another model, the scoring function 236 is not necessarily a linear model that is based purely on historical latencies of the user account. The scoring function 236 can be generated by a machine learning engine implemented by the scoring function engine 218 and take into account any session variable about the request for the content page that can be detected, historical site hits stored as archived session data 241, or any other contextual information that can be detected, such as time of day, day of the week, a month of the year, etc. The scoring function 236 can also identify coefficients that should be applied the session variables or other contextual information as well as a linear or polynomial function that should be employed to calculate a score corresponding to a predicted latency of the request. In one embodiment, the scoring function 236 can be continually or periodically updated by the scoring function engine 218 based upon archived session data 241 associated with a population of users of a network site.

As noted above, a score corresponding to a high predicted latency can result in selection of a page layout 243 that is tailored for a high latency, where certain features or components can be disabled or omitted to facilitate transmission to and rendering by the client device 206 within a particular goal latency. A low predicted latency can result in selection of a page layout 243 that is tailored for lower latency, where certain features or components can be included even though they are suited for higher bandwidth or lower latency environments. The page layout engine 215 can then generate a content page according to the selected page layout 243 and provide the content page to the content page server 224, which can serve the content page to the client device 206 over the network 209.

In some examples, the content page generated by the page layout engine 215 and served to the client device 206 can include client side code that reports back to the content page server 224 information that can be stored as archived session data 241. In one embodiment, the client side code can report a timestamp or another indication that rendering of the content page or critical features in the content page is complete. Such data can be reported as post back data to the content page server 224, which can provide the data to the session data archiver 221. In one embodiment, the session data archiver 221 can provide a queue for data received by the content page server 224 back from client devices 206. Additionally, the content page server 224 can report its own metrics regarding performance, such as when transmission of a content page to the client device 206 began and when it was completed. The data generated by the content page server 224 can also be provided to the session data archiver 221.

The session data archiver 221 can store data received from the content page server 224, whether the data is data posted back from a client device 206 or performance metrics generated by the content page server 224. The session data archiver 221 can provide a queue that the content page server 224 can place data for archiving in the data store 212 to that the content page server 224 does not introduce any latencies into its serving of content pages to client device 206 due to data store 212 interactions.

Figure 3:
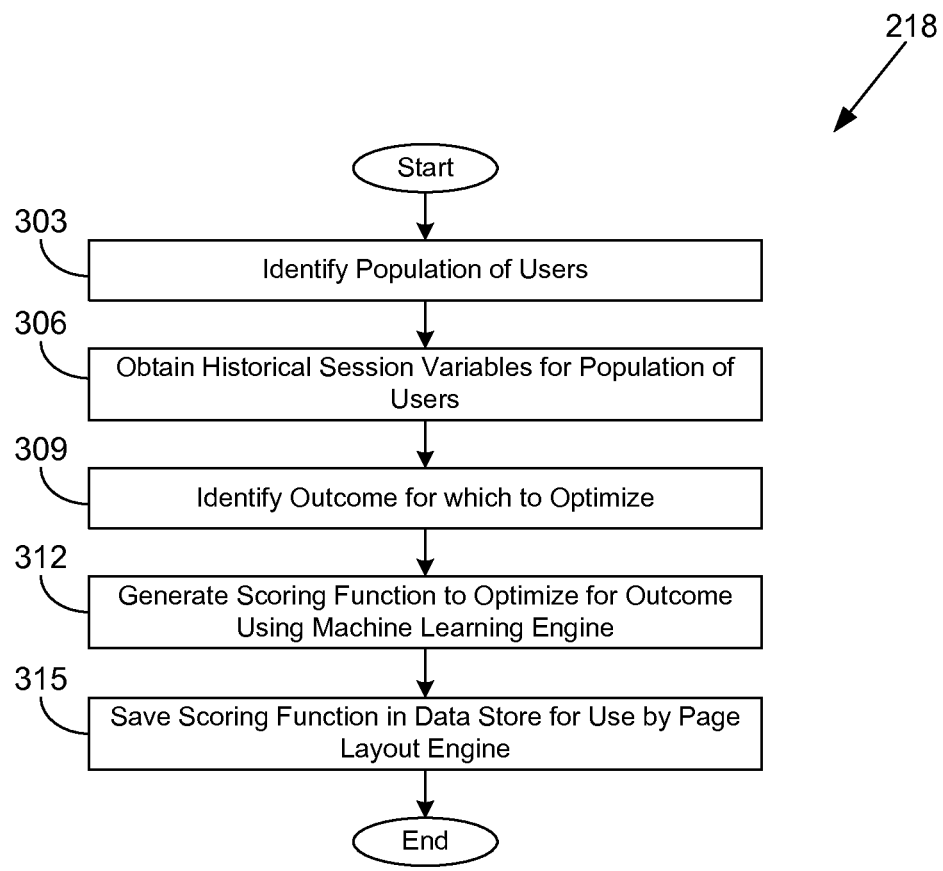
FIG. 3 is a flowchart illustrating one example of functionality implemented in a computing environment in the networked environment of FIG. 2 according to various embodiments of the present disclosure.

Referring next to FIG. 3, shown is a flowchart that provides one example of the operation of a portion of the scoring function engine 218 according to various embodiments. It is understood that the flowchart of FIG. 3 provides merely an example of the many different types of functional arrangements that may be employed to implement the operation of the portion of the scoring function engine 218 as described herein. As an alternative, the flowchart of FIG. 3 may be viewed as depicting an example of elements of a method implemented in the computing environment 203 (FIG. 2) according to one or more embodiments. FIG. 3 illustrates an example of how the scoring function engine 218 can generate a scoring function 236 that is stored in the data store 212 for use by the page layout engine 215 to score a request for a content page that is received from a client device 206.

Beginning with box 303, the scoring function engine 218 can identify a population of users for which archived session data 241 can be analyzed to generate a scoring function 236. The population of users can represent users of a network site for which historical data about user sessions or site hits is archived. At box 306, the scoring function engine 218 can obtain historical session variables or archived session data 241 associated with the population of users. The historical session variables can represent any data that is archived with respect to a client device, user account, network connection or any other contextual information about a respective site hit or session.

At box 309, the scoring function engine 218 can identify a particular outcome for which to optimize when generating a scoring function 236. As noted above, the scoring function engine 218 can generate a scoring function 236 that optimizes for a latency between when a request for a content page is received and when one or more critical feature in the requested content page is rendered by the client device 206. Such a latency can be thought of as a user's perceived latency. The scoring function engine 218 can also optimize for other outcomes in alternative embodiments, such as a user experience or engagement metric, a sales metric, or any other outcome.

At box 312, the scoring function engine 218 can generate a scoring function that optimizes for the selected outcome. As noted above, the scoring function engine 218 can implement a machine learning engine or algorithm that analyzes archived session data 241 and arrives at a scoring function 236 that generates a score associated with a predicted outcome for a given request for a content page. At box 315, the scoring function engine 218 can save the scoring function 236 in the data store 212 for use by the page layout engine 215. Thereafter, the operation of the scoring function engine 218 ends.

Figure 4:
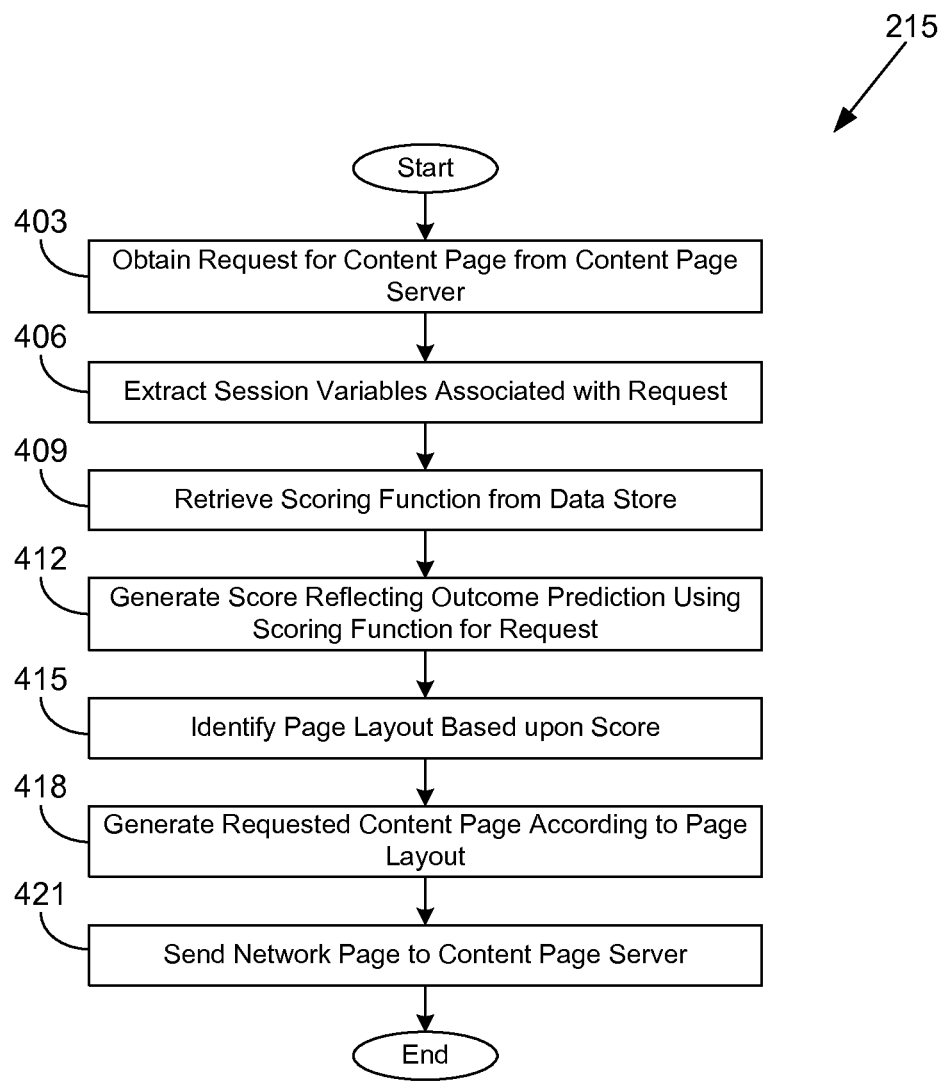
FIG. 4 is a flowchart illustrating one example of functionality implemented in a computing environment in the networked environment of FIG. 2 according to various embodiments of the present disclosure.

Moving now to FIG. 4, shown is a flowchart that provides one example of the operation of a portion of the page layout engine 215 according to various embodiments. It is understood that the flowchart of FIG. 4 provides merely an example of the many different types of functional arrangements that may be employed to implement the operation of the portion of the page layout engine 215 as described herein. As an alternative, the flowchart of FIG. 4 may be viewed as depicting an example of elements of a method implemented in the computing environment 203 (FIG. 2) according to one or more embodiments. The flowchart of FIG. 4 depicts an example of how the page layout engine 215 can generate a content page according to a selected page layout 243.

Beginning with box 403, the page layout engine 215 can obtain a request for a content page from the content page server 215. At box 406, the page layout engine 215 can extract session variables that are associated with the request. Session variables can include information about the client device 206 requesting the content page, a network connection of the client device 206 and/or a user account associated with the request. At box 409, the page layout engine 215 can retrieve the scoring function 236 generated by the scoring function engine 218 from the data store 212. In some embodiments, the page layout engine 215 can cache the most recent scoring function 236.

At box 412, the page layout engine 215 can generate a score using the scoring function 236 that reflects a predicted outcome for which the scoring function 236 is optimized. In one example, the predicted outcome can be a predicted latency associated with the request for the content page. At box 415, the page layout engine 215 can identify a page layout that corresponds to the generated score. In one example, the selected page layout 243 can include features and components that are configured to help the client device 206 render critical features in the content page within a goal latency standard based upon the predicted latency. At box 418, the page layout engine 215 can generate the requested content page according to the selected page layout 243. At box 421, the page layout engine 215 can provide the content page to the content page server 424, which can serve the content page to the client device 206. Thereafter, the portion of the page layout engine 215 ends.

Figure 5:
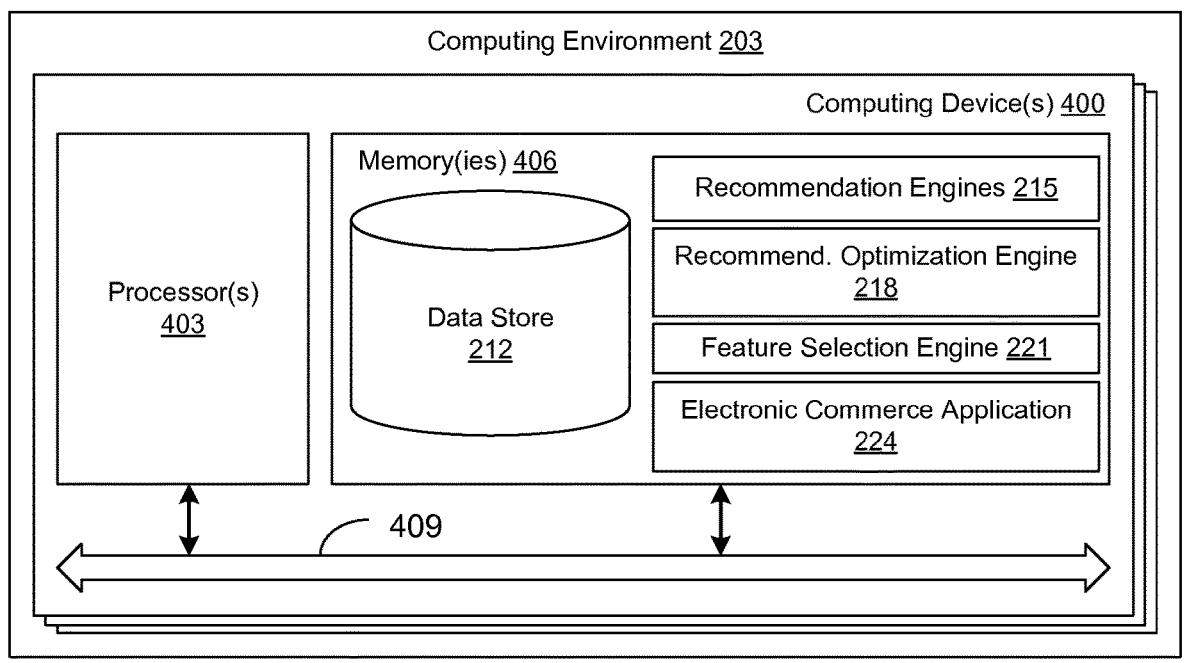
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the page layout engine 215, the scoring function engine 218, the session data archiver 221, the content page server 224, and potentially other applications. Also stored in the memory 506 may be a data store 212 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 406, or between any two of the memories 506, etc. The local interface 509 may comprise additional systems designed to coordinate this communication, including, for example, performing load balancing. The processor 503 may be of electrical or of some other available construction.

Although the page layout engine 215, the scoring function engine 218, the session data archiver 221, the content page server 224, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-4 show the functionality and operation of an implementation of portions of the scoring function engine 218 and the page layout engine 215. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3-4 show a specific order of execution, it is understood that the order of execution may differ from that which is depicted. For example, the order of execution of two or more blocks may be scrambled relative to the order shown. Also, two or more blocks shown in succession in FIGS. 3-4 may be executed concurrently or with partial concurrence. Further, in some embodiments, one or more of the blocks shown in FIGS. 3-4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the page layout engine 215, the scoring function engine 218, the session data archiver 221, and the content page server 224, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the page layout engine 215, the scoring function engine 218, the session data archiver 221, and the content page server 224, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices 500 in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method comprising:
    obtaining a request to generate a content page on behalf of a user, the request associated with a client device in communication with at least one computing device over a network connection;
    generating a request to identify a page layout from a plurality of page layouts for the request, wherein each of the page layouts has a varying complexity associated with a varying transmission time to the client device over the network connection;
    generating a score associated with the client device in response to the request to identify the page layout, the user and the network connection, the score being based upon a feature latency which was determined from a timestamp between when a previous request was received and when a recommendation feature embedded in a previous content page was rendered by the client device, the score being further based upon a set of historical latencies associated with a plurality of similar users, wherein the similar users are similar to the user based upon a device type, a network location, an identity of a browser executed by the client device, and an operating system of the client device associated with a session of the user, wherein the recommendation feature generates a plurality of recommended items for the content page;
    selecting the page layout based upon the score and a respective arrangement of the page layout for displaying the plurality of recommended items within the recommendation feature, wherein the page layout is selected based upon maximizing a user engagement metric associated with the content page, wherein the user engagement metric is based upon how long the plurality of similar users interacted with a plurality of previous respective content pages generated using the page layout;
    generating the content page according to the page layout; and
    transmitting the content page to the client device.

2. The method of claim 1, wherein the score is based upon a machine learning model that is trained to optimize according to an outcome associated with a plurality of site hits over a period of time.

3. The method of claim 2, wherein the outcome comprises a latency from when a respective site hit occurs and the recommendation feature embedded in a respective content page associated with the respective site hit is rendered by the client device.

4. The method of claim 2, further comprising selecting the page layout in response to a generated score that is associated with a high predicted latency relative to a latency threshold, the page layout having at least one asynchronous component disabled.

5. A system, comprising:
    at least one computing device; and
    a page layout engine executed in the at least one computing device, the page layout engine configured to cause the at least one computing device to at least:
        obtain a request to generate a content page on behalf of a user and a client device in communication with the at least one computing device over a network connection;
        identify an outcome associated with the request to generate the content page;
        generate a score associated with the outcome and the request to generate the content page, the score based on at least one of the client device and the network connection, the score being further based upon a feature latency which was determined from a timestamp between when a previous request was received and when a recommendation feature embedded in a previous content page was rendered by the client device, wherein the recommendation feature generates a plurality of recommended items for the content page;
        identify a selected page layout based upon the score and a respective arrangement associated with the selected page layout for displaying the plurality of recommended items within the recommendation feature, wherein the selected page layout is further selected based upon maximizing a user engagement metric associated with the content page, wherein the user engagement metric is based upon how long a plurality of similar users interacted with a plurality of previous respective content pages generated using the selected page layout; and
        generate the content page according to the selected page layout.

6. The system of claim 5, wherein the page layout engine is further configured to at least:
    transmit the content page to the client device; and
    obtain post back data from an application rendering the content page in the client device, wherein the post back data is generated by client-side code embedded in the content page.

7. The system of claim 5, wherein the score is based upon a set of historical latencies associated with at least one of a user account associated with the user, the client device, or the network connection.

8. The system of claim 5, wherein the outcome comprises a latency associated from when a respective site hit occurs and when the recommendation feature embedded in a respective content page is rendered by a respective client device.

9. The system of claim 8, wherein the recommendation feature comprises a particular page element embedded in the respective content page, the particular page element being associated with content requested by the user.

10. The system of claim 5, wherein the outcome comprises at least one of a customer engagement metric or a sales metric associated with a site corresponding to the content page.

11. The system of claim 5, wherein the score is calculated based upon coefficients generated by a machine learning engine, the machine learning engine configured to calculate the coefficients based upon an analysis of a plurality of site hits associated with a population of users, the coefficients based upon a plurality of historical latencies associated with a plurality of historical site hits associated with the population of users.

12. The system of claim 11, wherein the coefficients are applied to a plurality of session variables associated with the request.

13. The system of claim 5, wherein the selected page layout comprises a low bandwidth page layout in response to the score corresponding to a high predicted latency between the at least one computing device and the client device.

14. The system of claim 5, wherein the selected page layout comprises a high bandwidth page layout in response to the score corresponding to a low predicted latency between the at least one computing device and the client device.

15. The system of claim 5, wherein the at least one computing device is configured to execute a content page server, the content page server configured to obtain session data posted by the client device associated with rendering the content page, the session data including information about a latency associated with rendering of the content page by the client device, wherein the information about the latency is archived in a data store.

16. A method, comprising:
obtaining, by at least one computing device, a request to generate a content page on behalf of a user, the request being associated with a client device in communication with a network connection;
identifying, by the at least one computing device, a plurality of session variables associated with the request;
generating, by the at least one computing device, a score based upon the plurality of session variables, the score optimized to achieve a particular outcome associated with rendering of the content page by the client device, the score being further based upon a feature latency determined from a timestamp between when a previous request was received and when a recommendation feature embedded in a previous content page was rendered by the client device, wherein the recommendation feature generates a plurality of recommended items for the content page; and
identifying, by the at least one computing device, a page layout based upon the score and a respective arrangement associated with the page layout for displaying the plurality of recommended items within the recommendation feature, wherein the page layout is selected based upon maximizing a user engagement metric associated with the content page, wherein the user engagement metric is based upon how long a plurality of similar users interacted with respective content pages generated using the page layout.

17. The method of claim 16, wherein the score is generated based upon a plurality of coefficients applied to at least a subset of the session variables.

18. The method of claim 16, further comprising determining, by the at least one computing device, the timestamp based upon receiving an indication the recommendation feature has been rendered on the client device, wherein the indication is received from client side code executed by a browser on the client device.

19. The method of claim 16, wherein the respective arrangement for displaying the plurality of recommended items generated by the recommendation feature comprises a list structure or a table structure.

\* \* \* \* \*